US005578116A

United States Patent [19]

Chang

[11] Patent Number: 5,578,116

[45] Date of Patent: Nov. 26, 1996

[54] METHOD AND APPARATUS FOR CONTROLLING ZEBRA MUSSELS IN WATER CONDUITS

[75] Inventor: Tiao J. Chang, Athens, Ohio

[73] Assignee: Ohio University, Athens, Ohio

[21] Appl. No.: 282,346

[22] Filed: Oct. 11, 1994

Related U.S. Application Data

[62] Division of Ser. No. 80,047, Jun. 18, 1993, Pat. No. 5,376, 282.

[51] Int. Cl.[6] .......... C02F 1/20

[52] U.S. Cl. .......... 96/194; 210/750; 210/764; 422/6; 422/33; 95/260; 95/266

[58] Field of Search .......... 210/750, 764; 422/6, 33; 95/260, 266; 96/194

[56] References Cited

U.S. PATENT DOCUMENTS

| | | | |
|---|---|---|---|
| 1,321,999 | 11/1919 | Elliott | 95/266 |
| 1,650,129 | 11/1927 | Jacobus | 210/750 |
| 1,801,178 | 4/1931 | Sim | 95/266 |
| 1,809,441 | 6/1931 | Elliott . | |
| 2,147,677 | 2/1939 | Smith | 99/105 |
| 2,376,221 | 5/1945 | Baker | 183/2.5 |
| 3,116,999 | 1/1964 | Armbruster | 75/49 |
| 3,273,313 | 9/1966 | Livesay et al. | 95/266 |
| 3,616,601 | 11/1971 | Senkewich . | |
| 4,255,950 | 5/1981 | Makino et al. | 55/196 |
| 4,316,725 | 2/1982 | Hovind et al. | 95/260 |
| 4,328,638 | 5/1982 | Smithson | 43/124 |
| 4,432,775 | 2/1984 | Won | 55/41 |
| 4,548,622 | 10/1985 | Suzuki et al. | 55/204 |
| 4,565,634 | 1/1986 | Lydersen | 210/718 |
| 4,579,665 | 4/1986 | Davis et al. | 210/755 |
| 4,609,385 | 9/1986 | Burgess | 55/193 |
| 4,755,195 | 7/1988 | Compton et al. | 55/55 |
| 4,816,163 | 3/1989 | Lyons et al. | 210/698 |
| 4,857,209 | 8/1989 | Lyons et al. | 210/755 |
| 4,900,336 | 2/1990 | Pittner et al. | 95/260 |
| 4,906,385 | 3/1990 | Lyons et al. | 210/698 |
| 4,970,239 | 11/1990 | Whitekettle et al. | 514/665 |
| 5,008,075 | 4/1991 | Rufolo | 422/6 |
| 5,011,615 | 4/1991 | Minderman | 210/764 |
| 5,015,395 | 5/1991 | Muia et al. | 210/755 |
| 5,040,487 | 8/1991 | Bollyky et al. | 119/4 |
| 5,044,761 | 9/1991 | Yuki et al. | 366/139 |
| 5,062,967 | 11/1991 | Muia et al. | 210/755 |
| 5,069,722 | 12/1991 | Murphy | 134/22 |
| 5,096,601 | 3/1992 | Muia et al. | 210/755 |
| 5,128,050 | 7/1992 | Gill | 210/755 |
| 5,141,754 | 8/1992 | Ekis, Jr. et al. | 424/661 |
| 5,148,777 | 9/1992 | Brockburst | 123/41 |
| 5,152,637 | 10/1992 | Wayne | 405/127 |
| 5,160,047 | 11/1992 | McCarthy | 210/749 |
| 5,180,403 | 1/1993 | Kogure | 55/53 |
| 5,186,841 | 2/1993 | Schick | 210/760 |
| 5,192,451 | 3/1993 | Gill | 210/755 |
| 5,193,482 | 3/1993 | McLaughlin | 119/4 |
| 5,203,890 | 4/1993 | Tatsuo | 55/164 |

FOREIGN PATENT DOCUMENTS

| | | |
|---|---|---|
| 1193204 | 9/1985 | Canada . |
| 2405295 | 4/1974 | Germany . |
| 260008A1 | 9/1988 | Germany . |
| 0012914 | 5/1979 | Japan . |
| 643750 | 6/1984 | Switzerland . |
| 2173712 | 10/1986 | United Kingdom . |

*Primary Examiner*—Neil McCarthy

*Attorney, Agent, or Firm*—Standley & Gilcrest

[57] ABSTRACT

The present invention has two basic aspects: (a) a mechanical method for controlling the macrofouling of zebra mussels; and (b) a mechanical apparatus for reducing the dissolved oxygen of natural source water, such as for industrial or municipal use, to a level below that sufficient to support the survival respiration of zebra mussels.

4 Claims, 3 Drawing Sheets

METHOD AND APPARATUS FOR CONTROLLING ZEBRA MUSSELS IN WATER CONDUITS

This application is a divisional application of Ser. No. 08/080,047 filed Jun. 18, 1993, now U.S. Pat. No. 5,376,282.

TECHNICAL FIELD

The present invention has two basic aspects: (a) a mechanical method for controlling the macrofouling of zebra mussels; and (b) a mechanical apparatus for reducing the dissolved oxygen of natural source water, such as for industrial or municipal use, to a level below that sufficient to support the survival respiration of zebra mussels.

BACKGROUND OF THE INVENTION

On a daily basis, vast quantities of water are removed from rivers, lakes, and streams for potable water use and for use in a variety of industrial processes. The greatest industrial use of water is for cooling purposes, and the greatest non-consumptive industrial demand for water as a heat transfer medium comes from the steam-electric generating industry. Also, municipalities draw water for public consumption.

In water conduits, such as those used for industrial and commercial use, it is necessary to be able to conduct relatively large amounts of water to the desired industrial or municipal end use.

Source water supports an abundance of biological life forms, many of which cannot be removed from water before it is used. While some of these biological life forms may not adversely effect municipal or industrial treatment processes, zebra mussels are a biofouling organism which have become a severe problem in North America in a very short time. These mussels foul piping and equipment surfaces in municipal water treatment plants and industrial water systems.

Growths of sessile organisms such as mussels are of frequent occurrence on the walls of water pipes. Their presence is unwelcome mainly for two reasons: first because by reducing the effective bore of the pipe and increasing the roughness factor, they diminish the water carrying capacity of the system, and second, through setting up local differences in the state of oxidation on the inner surface they can be responsible for electro-corrosion of steel and cast-iron pipes. These consequences are responsible for much waste in the water supply industry in increased pumping costs, loss of water carrying and treatment capacity, in pipe cleaning, maintenance and replacement. Similarly, in the electrical power generation, the chemical, refinery and other industries they are responsible for diminished cooling capacity, lower production capacity and the more frequent cleaning maintenance and replacement.

The zebra mussel attaches itself to objects such as water pipes by up to 200 tough fibers of a dry horny material (the byssus) and usually leads a sessile existence. Frequently, the mussels fix these lyssel threads to other mussels, thus forming clusters in open water, and layers of up to a foot or more on walls and pipes.

The zebra mussel was unknown in the Laurentian Great Lakes prior to 1988 when substantial infestations were discovered in southeastern Lake St. Clair. Presumably, the mussels were introduced with ballast water discharged from the tanks of international shipping bout two years earlier.

They have spread throughout Lake Erie with phenomenal speed and reports of their presence at Green Bay, Wis. and Gary, Ind. on Lake Michigan imply that it is only a matter of time before all the Great Lakes and the adjacent Mississippi and Ohio River Basis are affected. With time, the threat may extend to every body of surface water in North America.

The explosive development of the mussel population in western Lake Erie has prompted dire predictions for the future. The number of animals per unit area promises to increase exponentially, especially during the years immediately following the initial infestation.

A wide variety of methods have been used in an attempt to control the growth of zebra mussels.

Various methods have been proposed for the removal of existing growth of the zebra mussel such as by scraping the mussels from mains and tanks. This method is not only slow and expensive but the greatest drawback is that it cannot be expected to remove every mussel from the pipe mains and cooling or heat exchange equipment. Moreover, it means that the pipe mains and other equipment cannot be in service during the treatment intended to remove the Zebra Mussel.

High pressure water has also been used for removing zebra mussels from walls, trash racks, or other equipment. A suction pump is normally attached to a mechanical scrapper which can be used to dislodge and vacuum the zebra mussels out of an area. This method of course has the disadvantage of requiring operation and maintenance of the equipment by a work force; and may not be applicable to all water conduits, such as those of smaller diameter. An example of such mechanical cleaning apparatus is that taught in U.S. Pat. No. 5,069,722.

Another method which has been used for controlling Zebra Mussels is the application of toxic and non-toxic coated materials which can either prevent zebra mussel settlement or cause very weak byssal attachment (so that the mussels can be more easily removed). These products include silicone and epoxy compounds, copper-based paints, and thermal metallic sprays. These materials can be used on structures that are difficult to clean or if there are anticipated difficulties with removal and disposal of large numbers of zebra mussels. Some of the drawbacks of the use of such coatings include the expense of the coatings and their application, and the possibility that some coatings may be inappropriate for some applications due to the end use of the water; e.g. in municipalities and for certain chemical or other industrial operations.

Many oxidizing and non-oxidizing chemical control agents have also been used to reduce or eliminate zebra mussels. Chlorine is a commonly used control agent in Europe, this country, and Canada. Continuous exposure to chlorine at 0.5 mg/L will kill zebra mussels in 14–21 days, which is preferable to application of a concentrated "slug dose" that zebra mussels can withstand for several days by closing their shells. Chlorine can be used in pipes or ducks that contains pressure sensing or other equipment. Chlorine has bee proposed for the removal of the mussels and dosing of the water with up to 50 ppm chlorine as it flows through the main for periods upwards of two weeks has been shown to be a reliable method of control.

However, the use of chlorine for such purposes has certain obvious disadvantages since it is quite toxic to humans and animals and is corrosive to the operating equipment. It produces undesirable often toxic, even carcinogenic, chlorinated organic compounds in the water.

A wide variety of other chemical agents have been used in attempt to control zebra mussel growth. These include the use of a nitrostyrene compound and an alkyl thiocyanate compound as taught in U.S. Pat. No. 4,579,665; the use of a water-soluble alkyl guanidine salt as taught in U.S. Pat. No. 4,816,163; the use of a water-soluble quaternary ammonium salt, such as those taught in U.S. Pat. No. 4,857,209; the use of an alkylthioalkylamine or acid addition salt thereof, such as that taught in U.S. Pat. No. 4,970,239; the use of a water-soluble dialkyl diallyl quaternary ammonium polymer (polyquat), such as that taught in U.S. Pat. No. 5,015,395; the use of an effective amount of ozone, such as that taught in U.S. Pat. No. 5,040,487; the use of didecyl dimethyl ammonium halide such as taught in U.S. Pat. No. 5,062,967; the use of a combination of a chlorine solution and a bromide salt capable of releasing bromide ions, such as taught in U.S. Pat. No. 5,141,754; and the use of glutaraldehyde, such as taught in U.S. Pat. No. 5,160,047.

Chemical methods such as those described above have the obvious disadvantages of requiring the purchase of expensive chemicals as well as, in many cases, the need to use skilled operators in their application. Chief among the disadvantages of such chemical methods is of course the toxic and polluting effect that these chemicals can have for the end user, such as municipalities, or for the environment at large.

Still another disadvantage of many of the above-described methods is that such methods cannot be effectively used while the water is flowing through the conduit. Flowing water may have the effect of diluting the chemical agents below their respective effective concentration.

Accordingly, it is desirable to be able to develop a method for controlling zebra mussels which may be applied to a flow of water, particularly those used for the necessary throughput in municipal and industrial applications.

It is yet another object of the present invention is to provide an efficient flow of water which has been treated to control macrofouling pests, such as zebra mussels.

It is also desirable to be able to develop such a method which can be applied without the need to use skilled operators or workmen in the process.

In view of the present disclosure and the practice of the present invention, other advantages or the alleviation of other problems may become apparent.

SUMMARY OF THE INVENTION

The method of the present invention fundamentally involves the reduction of oxygen from large volumes of water so as to control the population of zebra mussels. The method of the present invention allows both chronological and energetic efficiency in the control of zebra mussels within a required discharge of flowing water.

Toward providing the above-described advantages and overcoming the deficiencies of the above-described methods, the method of the present invention comprises a method for controlling the population of zebra mussels in a water conduit, the method comprising the steps of: (a) conducting a flow of water, the water containing dissolved oxygen at an original concentration and being subject to infestation by zebra mussels, through an enclosed conduit, the conduit adapted to maintain an air space in contact with the flow of water; and (b) subjecting the air space to a vacuum so as to reduce the concentration of the dissolved oxygen in the flow of water to below a level sufficient to support the survival respiration concentration of the zebra mussels, whereby macrofouling is effectively prevented.

For zebra mussels, it has been found that their population can be controlled by reducing the concentration level to which the dissolved oxygen is reduced to within a range of from about 40% to about 20% saturation, preferably from about 35% to about 25% saturation and most preferably 30% saturation. Typical naturally occurring water is considered saturated at about 10 ppm oxygen, although the saturation point of each particular water sample may vary. As used herein, unless otherwise specified, all percentage ranges are given as a percentage of saturation.

The present invention also comprises an apparatus for controlling the population of zebra mussels to prevent macrofouling, the apparatus comprising: (1) a water conduit adapted to conduct a flow of water, the water containing dissolved oxygen at an original concentration and being subject to potential infestation by zebra mussels, the conduit adapted to maintain an air space in contact with the flow of water (such as through the use of a vacuum chamber tank); and (2) vacuum producing means adapted to subject the air space to a vacuum so as to reduce the concentration of the dissolved oxygen in the flow of water to below a level sufficient to support the survival respiration of zebra mussels; the vacuum producing means comprising: (1) a vacuum chamber tank having an inlet; and (2) a siphon attached to the inlet of the vacuum chamber tank. In order to increase the throughput of the apparatus, the apparatus can be used in parallel as described more fully hereinbelow. Also, to both assist in the throughout of water through the apparatus and to better control the population of zebra mussels, the apparatus can may also comprise a siphon at the intake(s). It has been shown that the use of a siphon increases the mortality rate of the zebra mussels. Accordingly, the present invention may comprise water conduit adapted to conduct a flow of water, the water containing dissolved oxygen at an original concentration and being subject to infestation by zebra mussels, the conduit adapted to maintain a series of at least two air spaces in contact with the flow of water (e.g. through two or more vacuum chamber tanks); and each of the at least two air spaces each being provided with vacuum producing means adapted to subject the each air space to a vacuum so as to reduce the concentration of the dissolved oxygen in the flow of water to below a level sufficient to support the survival respiration concentration of the zebra mussels. This apparatus may also comprise at least one of the vacuum producing means which comprises: (1) a vacuum chamber having a water intake; and (2) a siphon attached to the water intake of the vacuum chamber.

DETAILED DESCRIPTION OF THE PREFERRED EMBODIMENT

In accordance with the foregoing summary of the invention, the following presents a detailed description of the preferred embodiment of the invention, which is also presently considered to be the best mode of the invention.

Figure 1:
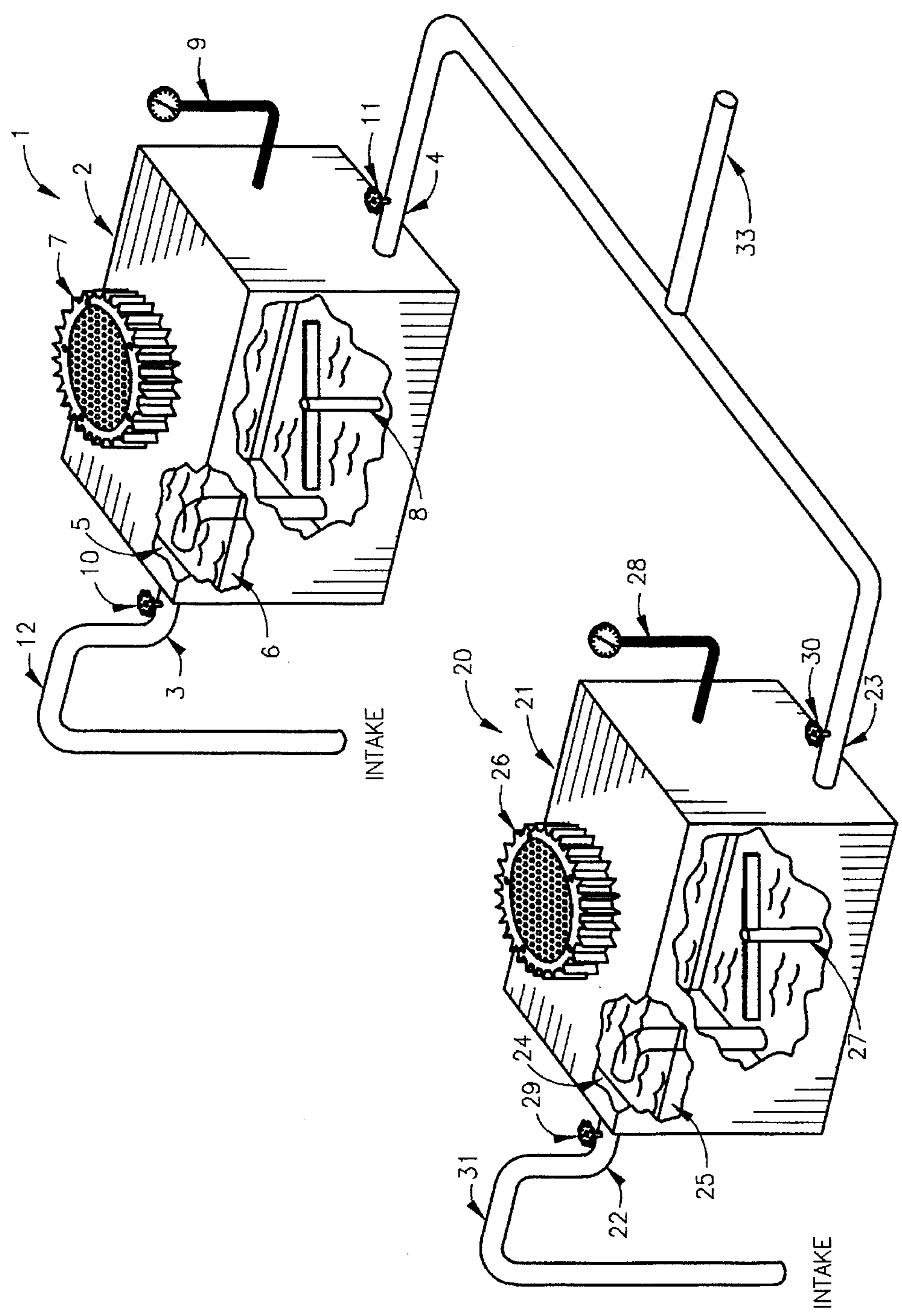
FIG. 1 shows a sectioned perspective view of an apparatus in accordance with one preferred embodiment of the invention.

FIG. 1 shows a sectioned perspective view of an apparatus in accordance with the preferred embodiment of the invention.

FIG. 1 shows vacuum unit 1 having vacuum chamber 2 which is adapted to accept and transmit a flow of water 6 from inlet conduit 3 to outlet conduit 4. The inlet and outlet tubing may be of any appropriate material, such as metal or PVC tubing.

Vacuum chamber 2 also is adapted to maintain an air space 5 above water 6. The vacuum chamber 2 as shown in FIG. 1 is 2 feet wide, 2 feet long and 3 feet high. Vacuum chamber 2 may be made to any other appropriate dimensions, depending upon the desired capacity of the system. Vacuum chamber 2 may be constructed of any appropriate material which is capable of withstanding the applied pressure differentials. Such materials include plastic or plexiglas, appropriately reinforced.

Connected in fluid communicative contact with air space 5 is vacuum pump 7 shown as located in its housing. Vacuum pump 7 serves to maintain a vacuum in air space 5 so as to extract dissolved gases, including oxygen, from water 6. The pump 7 should have a capacity to remove the air in air space 5 and achieve a vacuum pressure of 10–15 p.s.i.

Also shown in FIG. 1 is a mechanical agitation device, i.e. propeller 8, disposed in the vacuum unit 1. Vacuum unit 1 also is provided with dissolved oxygen sensor 9 which is used to monitor the level of oxygen in the water 6 as it flows through vacuum chamber 1.

FIG. 1 also shows that inlet 3 and outlet 4 may be provided, respectively, with valves 10 and 11.

To increase the rate of throughput, inlet 3 may be provided with siphon arrangement 12. The siphons will typically be less than 30 feet in height above the intake.

FIG. 1 further shows that the total throughput and discharge rate of the system can be increased through use of more than one such vacuum unit operating in parallel, as exemplified by additional vacuum unit 20 which, through use of an additional siphon conduit and common output conduit 33, can be used to deplete the oxygen from water from a common source and send it to a common destination. Parts and features of vacuum unit 2, corresponding to parts and features of vacuum unit 1 (i.e parts and features 2–12), are numbered 21–31, respectively.

It is preferred that the flow rate and the vacuum be selected to result in the reduction of the dissolved oxygen to within an oxygen content range of from about 20% to about 40% saturation, preferably within a range of from about 25% to about 35% saturation. It is most preferred that the dissolved oxygen be removed to a level of about 30% saturation as this level has been found to substantially reduce the population of zebra mussels. To do this, it has been found that a vacuum of approximately 10 to 12 p.s.i. may be maintained in the air space over the flowing water in the vacuum chamber tank. Such a vacuum pressure reduces the dissolved oxygen to from about 50% to 20% of saturation, however the performance of each system will vary depending upon the water flow rate, the degree of agitation, the air space volume of the vacuum chamber, etc.

Figure 2:
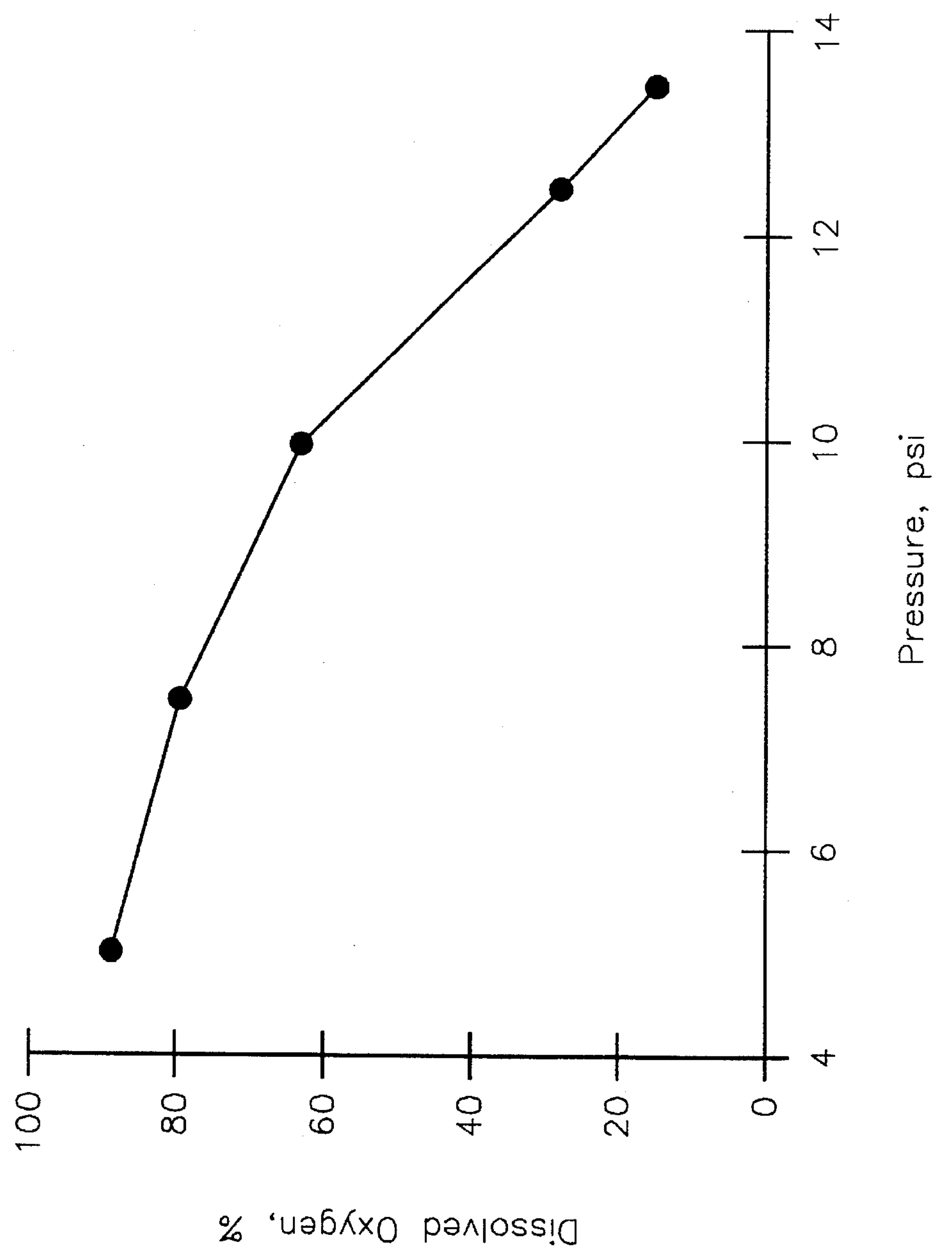
FIG. 2 is a graph showing the relationship between the percent dissolved oxygen and the vacuum pressure used is accordance with one embodiment of the invention.

The relationship between the percent dissolved oxygen and the vacuum pressure used is shown in FIG. 2.2.

The device of the present invention can be used by opening the inlet valve(s) of the vacuum chamber(s) to allow water to be contain therein. The vacuum pump(s) can then be used to remove the dissolved oxygen from the portion of water in the chamber to the desired level, after which the outlet valve(s) is/are opened to release the oxygen depleted water. The device of the present invention may also accommodate flowing water by adjusting the inflow and outflow rates of the water with due regard for the time parameters required to deplete the oxygen to the desired level. Through the use of known physical and thermodynamic calculations and/or by monitoring the level of dissolved oxygen, one can determine the appropriate residence time for the water in the vacuum chamber, the degree of agitation, the air space above the liquid, and the pump capacity and efficiency, and other process parameters, without undue experimentation.

Figure 3:
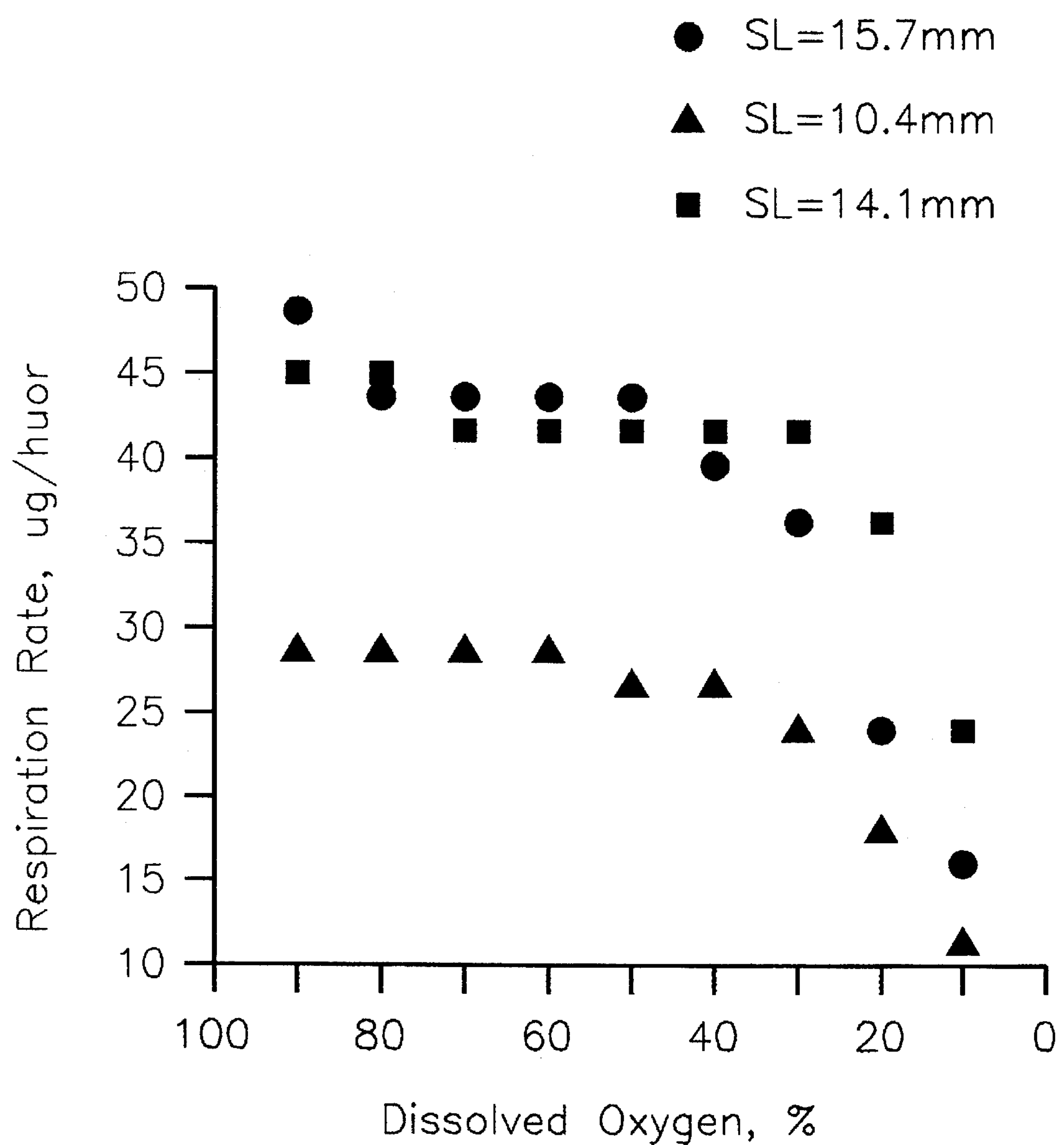
FIG. 3 is a graph showing the relationship of the respiration rate of the zebra mussel (in micrograms/hour) as compared to the dissolved oxygen content expressed as a percentage of saturation.

FIG. 3 is a graph showing the relationship of the respiration rate of the zebra mussel (in micrograms/hour) as compared to the dissolved oxygen content expressed as a percentage of saturation. Three curves are presented for various mussel shell lengths.

In light of the foregoing disclosure or through practice of the present invention, it will be within the ability of one understanding the invention to make alterations and modifications to the present invention, such as through the substitution of equivalent parts, arrangements or geometries, without departing from the spirit of the invention.

What is claimed is:

1. An apparatus for controlling the macrofouling of zebra mussels, said apparatus comprising:

a water conduit adapted to conduct a flow of water containing zebra mussels said flow of water, said water containing dissolved oxygen at an original concentration, said conduit adapted to maintain an air space in contact with said flow of water; and vacuum producing means adapted to subject said air space to a vacuum of a vacuum pressure in the range of from about 10 p.s.i. to about 15 p.s.i. so as to reduce the concentration of said dissolved oxygen in said flow of water to below a level sufficient to support the survival respiration concentration of said zebra mussels.

2. An apparatus for controlling the population of zebra mussels, said apparatus comprising:

a water conduit adapted to conduct a flow of water containing zebra mussels said flow of water, said water containing dissolved oxygen at an original concentration, said conduit adapted to maintain an air space in contact with said flow of water; and vacuum producing means adapted to subject said air space to a vacuum so as to reduce the concentration of said dissolved oxygen in said flow of water to below a level sufficient to support the survival respiration concentration of said zebra mussels; said vacuum producing means comprising:

a vacuum chamber having a water intake; and a siphon attached to said water intake of said vacuum chamber.

3. An apparatus for controlling the macrofouling of zebra mussels, said apparatus comprising:

a water conduit adapted to conduct a flow of water containing zebra mussels said flow of water, said water containing dissolved oxygen at an original concentration, said conduit connected to at least two vacuum chambers each adapted to maintain an air space in contact with said flow of water; and each of said at least two vacuum chambers being provided with vacuum producing means adapted to subject said each air space to a vacuum so as to reduce the concentration of said dissolved oxygen in said flow of water to below a level sufficient to support the survival respiration concentration of said zebra mussels.

4. An apparatus according to claim 3 wherein at least one of said vacuum producing means comprises:

a vacuum chamber having a water intake; and a siphon attached to said water intake of said vacuum chamber.

* * * * *